United States Patent
Huertas Amaya et al.

(10) Patent No.: US 8,435,591 B2
(45) Date of Patent: May 7, 2013

(54) MILK FAT SUBSTITUTE AND PRODUCTION METHOD THEREFOR

(75) Inventors: José María Huertas Amaya, Bogotá (CO); Adriana Fernanda Cruz Serna, Bogotá (CO); Luidy Alfonso Rodríguez Posada, Bogotá (CO)

(73) Assignee: Team Foods Colombia S.A. (CO)

( * ) Notice: Subject to any disclaimer, the term of this patent is extended or adjusted under 35 U.S.C. 154(b) by 264 days.

(21) Appl. No.: 12/678,084

(22) PCT Filed: Sep. 13, 2007

(86) PCT No.: PCT/IB2007/002806
§ 371 (c)(1),
(2), (4) Date: Mar. 12, 2010

(87) PCT Pub. No.: WO2009/034407
PCT Pub. Date: Mar. 19, 2009

(65) Prior Publication Data
US 2010/0303992 A1    Dec. 2, 2010

(51) Int. Cl.
*A23D 7/00*    (2006.01)

(52) U.S. Cl.
USPC ........... 426/601; 426/603; 426/606; 426/607; 426/610; 426/612

(58) Field of Classification Search ......... 426/491, 426/601, 602, 603, 606, 607, 610
See application file for complete search history.

(56) References Cited

U.S. PATENT DOCUMENTS

| 4,447,462 A | 5/1984 | Tafuri |
| 4,594,194 A * | 6/1986 | Dieffenbacher ............... 554/211 |
| 5,556,972 A * | 9/1996 | Keulemans et al. ........... 554/211 |
| 2005/0276900 A1 * | 12/2005 | Ullanoormadam ........... 426/601 |

FOREIGN PATENT DOCUMENTS

| ES | 2076293 | 1/1995 |
| ES | 2136322 | 11/1999 |
| ES | 2246287 | 2/2006 |
| GB | 1444820 | 4/1976 |

OTHER PUBLICATIONS

Alexandersen: Margarine Processing Plants and Equipment; Chapter 12 of Bailey's Industrial Oil and Fat Products, Sixth Edition, Six Volume Set; Copyright 2005 John Wiley and Sons, Inc.*

Kellens: Palm oil fractionation; Fur. J. Lipid Sci. Technol. 109 (Feb. 13, 2007) 336-349.*

Kellens, M. et al., Palm oil fractionation. European Journal of Lipid Science and Technology. Apr. 2007, vol. 109, No. 4, pp. 336-349, ISSN 1438-7697.

Arnaud, et al., Thermal characterization of chicken fat dry fractionation process. Journal of Food Engineering, Feb. 1, 2006, vol. 72, No. 4, pp. 390-397. ISSN 0260-8774.

* cited by examiner

*Primary Examiner* — Patricia George
(74) *Attorney, Agent, or Firm* — Barry J. Schindler; Greenberg Traurig, LLP

(57) ABSTRACT

The invention relates to a milk fat substitute and to a method for producing same from a vegetable oil using a fractionation method, which is suitable for use in the production of products such as ice cream, biscuits, cakes, bread-making products, reconstituted milk, milk formulas, cheeses and other products.

14 Claims, No Drawings

MILK FAT SUBSTITUTE AND PRODUCTION METHOD THEREFOR

TECHNICAL FIELD

The present invention relates to a method for obtaining a milk fat substitute from a vegetable oil and the product obtained by means of said method for its application in the field of preparation of food products which generally are prepared with milk derived fats.

BACKGROUND OF THE INVENTION

Some milk fats substitutes obtained from vegetable oils are known in the state of the art.

However many of said substitutes are derived from animal fat and therefore, possess a high cholesterol level non adequate for food products due to its negative, consequences on people's cardiovascular system when consuming thereof.

Furthermore, the percentage of saturated fat is high, which is also a serious drawback for the health of people consuming this type of products. It has been found that a great intake of saturated fats is directly related with cardiovascular diseases development.

The substitutes of the state of the art have also a high level of short chain saturated fatty acids, which are easily hydrolysable, turning the substitute unstable in the presence of water. The short chain acids, among which are found butyric, caproic, capric, caprylic, and lauric acids are perceptible by the palate even at low concentrations. These fatty acids have flavor notes which range from rancid to soapy, which are transmitted directly into the food produced with substitutes of the state of the art.

Therefore, it is clear that there is a deep need for obtaining a milk fat substitute not having or showing a sensitive reduction of the aforementioned problems.

The product of the invention has the characteristics of zero cholesterol level compared to those of the state of the art, as well as a much lower level of saturated fat which makes it more healthy.

Also, the product of the invention contains a low level of short chain saturated fatty acids granting it a greater stability to hydrolysis and therefore, the food products made out of said substitute have a greater storage life, due to the fact that will not easily generate unpleasant flavors.

On the other hand, the product of the invention has some differences with respect to milk fat which make them better for their application in food products. Milk fat tends to vary its fatty acids profile depending on the time of the year, while the present product keeps constant its fatty acid profile. Also the amount of short chain fatty acids is lower, compared to milk fat, making it more stable to hydrolysis. Furthermore, the product of the invention, different from milk fat, has a zero cholesterol level.

The product of the invention has more application flexibility from an organoleptic point of view because it is possible to change the flavor, smell and color profiles, while this not possible with milk fats.

Document U.S. Pat. No. 5,395,629 discloses a process for obtaining a milk fat substitute through interesterification through chemical or enzymatic way of a stearic acid rich hydrogenated vegetable oil with a short chain fatty acid rich vegetable oil, such as caproic, caprylic and capric. The obtained product is a 100% saturated comprising only caproic, caprylic, capric, palmitic and stearic acids triglycerides.

BRIEF SUMMARY OF THE INVENTION

The present invention provides a process for obtaining a milk fat substitute from a vegetable oil, comprising two fractioning steps, and the milk fat substitute obtained, which comprises a mixture of the olein obtained in the first fractioning step with the olein obtained in the second fractioning step.

In a preferred embodiment of the invention, said vegetable oil is palm oil.

The product of the invention is used for manufacturing food products such as ice cream, biscuits, cakes, bread-making products, reconstituted milk, milk formulas and cheeses.

The product of the invention has surprising advantages over the state of the art milk fats such as a zero cholesterol content, low content of short chain saturated fatty acids and low total saturated fat levels.

DETAILED DESCRIPTION OF THE INVENTION

The present invention relates to producing a milk fat substitute and to a method for producing same from a vegetable oil.

In a preferred embodiment of the invention the starting oil is palm oil from the species *Elaeis guineensis, Elaeis oleifera* (*Elaeis melanocacca*), or from the fruit of hybrids obtained through crossing *E. guineensis* with *E. oleifera*.

The process for producing milk fat substitutes of the invention comprises two fractioning steps.

Fractioning can be dynamic or static type. Dynamic fractioning is carried out in dynamic crystallizers and soakers. Static fractioning is carried out in trays kept in a cold room or in refrigerated plates.

A preferred embodiment of the invention uses dynamic type of fractioning.

The oil is heated in the first fractioning step at a temperature ranging from about 60° C. to 90° C., preferably about 75° C. and 85° C. The fractioning time is between, around, 8 to 20 hours, Preferably, within a range around 12 to 16 hours. The final temperature must be between, about 14° C. and 27° C., preferably about 17° C. to 24° C.

Then, the oil is subjected to a filtration process in order to obtain a liquid fraction known as olein and a solid fraction known as stearine.

As a preferred embodiment of the invention, said filtration process can be carried out in a press filter. The feeding pressure is comprised between about 50 to 500 manometric kPa, preferably between about 100 and 400 manometric kPa. The squeeze pressure must be comprised between about 100 manometric kPA and 1 manometric MPa, preferably between 200 and 900 manometric kPa.

As a non-limiting example, the obtained olein may have the following characteristics:

| CHARACTERISTIC | VALUE (approximate) |
|---|---|
| Iodine index | 53-62 |
| Solids (SFC)* | |
| 10° C. | 22-36 |
| 20° C. | 12 maximum |
| 30° C. | 6 maximum |
| 35° C. | 4 maximum |
| 40° C. | 2 maximum |
| Fatty acids profile | |
| Lauric | 1% maximum |
| Myristic | 2% maximum |
| Palmitic | 33-45% |
| Stearic | 2-7% |
| Oleic | 37-49% |

| CHARACTERISTIC | VALUE (approximate) |
|---|---|
| Linoleic | 7-14% |
| Linolenic | 0.5% maximum |

*Solid Fat Content

As another non-limiting example and as a preferred embodiment of the invention, the olein can have the following characteristics:

| CHARACTERISTIC | VALUE (approximate) |
|---|---|
| Iodine index | 56-59 |
| Solids (SFC)* | |
| 10° C. | 27-31 |
| 20° C. | 8 maximum |
| 30° C. | 3 maximum |
| 35° C. | 2 maximum |
| 40° C. | 1 maximum |
| Fatty acids profile | |
| Lauric | 0.6% maximum |
| Myristic | 1.2% maximum |
| Palmitic | 38-40% |
| Stearic | 4-5% |
| Oleic | 42-44% |
| Linoleic | 10-11% |
| Linolenic | 0.35% maximum |

*Solid Fat Content

As a non-limiting example, the obtained stearine may have the following characteristics:

| CHARACTERISTIC | VALUE (approximate) |
|---|---|
| Melting point (° C.) | 48-54 |
| Solids (SFC)* | |
| 20° C. | 60-70 |
| 30° C. | 37-45 |
| 40° C. | 21-27 |
| Fatty acids profile | |
| Lauric | 1% maximum |
| Myristic | 2% maximum |
| Palmitic | 48-60% |
| Stearic | 2-8% |
| Oleic | 27-38% |
| Linoleic | 3-9% |
| Linolenic | 0.5% maximum |

*Solid Fat Content

As another non-limiting example in another preferred embodiment of the invention, the stearine can have the following characteristics:

| CHARACTERISTIC | VALUE (approximate) |
|---|---|
| Melting point (° C.) | 50-53 |
| Solids (SFC)* | |
| 20° C. | 64-68 |
| 30° C. | 39-43 |
| 40° C. | 23-26 |
| Fatty acids profile | |
| Lauric | 0.6% maximum |
| Myristic | 1.5% maximum |
| Palmitic | 52-56% |
| Stearic | 4-6% |
| Oleic | 31-34% |
| Linoleic | 5-7% |
| Linolenic | 0.35% maximum |

*Solid Fat Content

The stearine obtained in the first fractioning step is heated in the second fractioning step at a temperature ranging from about 60° C. to 90° C., preferably in the range between about 75° C. and 85° C. The fractioning time is between, about 12 to 32 hours, preferably, within a range about 14 to 24 hours. The final temperature must be between about 37° C. and 47° C., preferably about 39° C. to 45° C.

Then, the stearine is subjected to a second filtration process in order to obtain a second olein and a second stearine.

The feeding pressure is comprised between about 100 and 800 manometric kPa, preferably between about 200 and 700 manometric kPa. The squeeze pressure must be comprised between about 1 and 3 manometric MPa, preferably between about 1.2 and 2.4 manometric MPa.

As a non-limiting example, the olein obtained through this second fractioning must, preferably, have the following characteristics:

| CHARACTERISTIC | VALUE (approximate) |
|---|---|
| Melting point (° C.) | 39-45 |
| Solids (SFC)* | |
| 10° C. | 64-76 |
| 20° C. | 42-54 |
| 30° C. | 18-26 |
| 35° C. | 11-19 |
| 40° C. | 5-12 |
| Fatty acids profile | |
| Lauric | 1% maximum |
| Myristic | 2% maximum |
| Palmitic | 44-54% |
| Stearic | 3-9% |
| Oleic | 30-40% |
| Linoleic | 5-10% |
| Linolenic | 0.5% maximum |

*Solid Fat Content

As another non-limiting example, in another preferred embodiment of the invention, the olein obtained in the second fractioning must have the following characteristics:

| CHARACTERISTIC | VALUE (approximate) |
|---|---|
| Melting point | 41-43 |
| Solids (SFC)* | |
| 10° C. | 68-72 |
| 20° C. | 46-50 |
| 30° C. | 20-24 |
| 35° C. | 13-17 |
| 40° C. | 7-10 |
| Fatty acids profile | |
| Lauric | 0.5% maximum |
| Myristic | 1.2% maximum |
| Palmitic | 47-51% |
| Stearic | 5-7% |

| CHARACTERISTIC | VALUE (approximate) |
| --- | --- |
| Oleic | 33-37% |
| Linoleic | 6-9% |
| Linolenic | 0.35% maximum |

*Solid Fat Content

Then, a mixture between about 50 to 90% of the olein obtained in the first fractioning with about 10 to 50% of the olein of the second fractioning, is made. In a preferred embodiment of the invention the mixture must be between about 60 to 73% of the first fractioning olein with about 27 to 40% of the second fractioning olein.

The product of the invention is then refined, bleached and deodorized, and color, flavor and emulsifiers are added and, finally, it is crystallized and packed.

As a non-limiting example, the product of the invention has, preferably, the following characteristics:

| CHARACTERISTIC | VALUE (approximate) |
| --- | --- |
| Melting point (° C.) | 30-40 |
| Solids (SFC)* | |
| 10° C. | 37-57 |
| 20° C. | 10-27 |
| 30° C. | 1-10 |
| 40° C. | 2 maximum |
| Fatty acids profile | |
| Lauric | 1% maximum |
| Myristic | 2% maximum |
| Palmitic | 34-48% |
| Stearic | 1-8% |
| Oleic | 35-49% |
| Linoleic | 6.5-13.5% |
| Linolenic | 0.5% maximum |
| Total saturated fats | 55% maximum |
| Cholesterol | 0 |

*Solid Fat Content

As another non-limiting example, the product of the invention has the following characteristics:

| CHARACTERISTIC | VALUE (approximate) |
| --- | --- |
| Melting point (° C.) | 32-36 |
| Solids (SFC)* | |
| 10° C. | 42-52 |
| 20° C. | 15-22 |
| 30° C. | 3-7 |
| 40° C. | 1 maximum |
| Fatty acids profile | |
| Lauric | 0.6% maximum |
| Myristic | 1.2% maximum |
| Palmitic | 39-43% |
| Stearic | 3-6% |
| Oleic | 40-44% |
| Linoleic | 8.5-11.5% |
| Linolenic | 0.35% maximum |
| Total saturated fats | 50% maximum |
| Cholesterol | 0 |

*Solid Fat Content

The milk fat substitutes obtained by the process of the invention have advantageous characteristics with respect to those known in the state of the art, as the first have zero cholesterol.

Besides, these substitutes have also a lower level of short chain saturated fatty acids thus are easily hydrolysable making the substitute more stable in the presence of water. Accordingly, the fat does not develop bad odor or flavors that may interfere with the natural food flavor or odor. Furthermore, the percentage of saturated fat is low, which is convenient for people's health after consuming this type of products.

It has been found that the product of the invention is very adequate for processing food products such as ice cream, biscuits, cakes, bread-making products, reconstituted milk, milk formulas and cheeses and other products.

EXAMPLES

The following examples illustrate the process for obtaining a milk fat substitute and its application in different food products. These examples shall not be construed as limitative but only illustrative of the present invention.

Example 1

Obtaining the milk fat substitute palm oil was heated up to 80° c. and then subjected to a 12 hour fractioning process and a final temperature of 18° C. The stearine obtained in this first fractioning step was then again heated up to 80° C. and fractioned during 24 hours and then cooled to a final temperature of 42° C. 33% of olein obtained during the second fractioning step was mixed with 67% of the olein obtained during the first fractioning step. Then, the mixture was refined, bleached and deodorized. Color, flavor and emulsifiers were added to the obtained product, which then was crystallized and packed.

The milk obtained fat substitute has the following characteristics:

| CHARACTERISTIC | MILK FAT SUBSTITUTE | MILK FAT |
| --- | --- | --- |
| Melting point (° C.) | 34.5 | 32.6 |
| Solids (SFC)* | | |
| 10° C. | 45.8 | 52.3 |
| 20° C. | 18.9 | 22.8 |
| 30° C. | 5.0 | 6.8 |
| 40° C. | 0.0 | 0.0 |
| Fatty acids profile | | |
| Butiric | | 3.6 |
| Caproic | | 2.2 |
| Caprylic | | 1.2 |
| Capric | | 2.5 |
| Lauric | 0.4 | 2.9 |
| Myristic | 1.0 | 10.8 |
| Myristoleic | | 0.8 |
| Pentadecanoic | | 2.1 |
| Palmitic | 40.9 | 26.9 |
| Palmitoleic | | 2.0 |
| Margaric | | 0.7 |
| Stearic | 4.6 | 12.1 |
| Oleic | 42.0 | 28.5 |
| Linoleic | 10.2 | 3.2 |
| Linolenic | 0.2 | 0.4 |
| Saturated fatty acids | 47.2 | 65.0 |
| Cholesterol (mg/100 g) | 0 | 14 |
| Flavor and odor | Butter | Milk/butter |

Example 2

Milk Fat Substitute Applied for Manufacturing Crimped Cookies

The crimped cookies were made under the following recipe:

Components:

| INGREDIENT | % | Mass (g) |
| --- | --- | --- |
| Flour | 100 | 500 |
| Milk fat substitute | 66.6 | 333 |
| Sugar | 34 | 170 |
| Salt | 0.4 | 2 |
| Eggs | 10 | 50 |
| Water | 11 | 55 |
| Powdered milk | 4 | 20 |

Cookies Elaboration Process:

The milk fat substitute of example 1 was stirred at medium speed along with sugar and salt for 10 minutes; eggs and water were added and stirring continued for 3 more minutes. Then the stirring speed was lowered and flour and milk were added. The so obtained product was molded using a sleeve having a crimped nozzle. The cookies were baked at 160° C. for 14 minutes. The resulting cookies were dusty, smooth, having open crumb, gilded and having butter taste and odor.

Example 3

Milk Reconstitution

The fat obtained in example 1 was used for reconstituting cow milk; the following ingredients were used:

| INGREDIENTS | % | Mass (kg) |
| --- | --- | --- |
| Skim milk | 96.875 | 19.375 |
| Milk fat substitute | 3.000 | 0.600 |
| Emulsifier (fatty acid mono- and diglycerides) | 0.125 | 0.025 |

To carry out the milk reconstitution, all the ingredients were mixed and were homogenized at 20 MPa using a two step, high pressure homogenizer; then the product was subjected to a UHT process.

The reconstituted milk was creamy, having a texture and viscosity similar to those of natural whole milk. The viscosity of the reconstituted milk was 11.7 mPa·s at 25° C. and its pH was 6.77.

Example 4

Elaboration of Soybean Milk with Chocolate Flavor 20 kg of soybean milk having chocolate flavor were made using the following formulation:

| INGREDIENTS | % | Mass (kg) |
| --- | --- | --- |
| 70% soybean concentrate | 4.300 | 0.860 |
| Milk fat substitute | 3.000 | 0.600 |
| Cocoa syrup | 9.000 | 1.800 |
| Sugar | 5.000 | 1.000 |
| Integrated mixture of emulsifier and stabilizers* | 0.225 | 45.000 |
| Water | 78.480 | 15.695 |

*fatty acid mono- and diglycerides, carrageenan and guar gum.

Process: Soybean concentrate and the mixture of emulsifier and stabilizers were added onto the water and heated up to 40° C. Sugar and cocoa syrup were added, then the milk fat substitute of example 1 previously melted was added. This mixture was homogenized at 20 MPa and subjected to a UHT process. The resulting product was creamy and having a very good taste such as that of soybean milks with chocolate flavor found in the market.

Example 5

Elaboration of Ice Cream Base 10 kg of ice cream base were made using the milk fat substitute of example 1. The following ingredients were used:

| INGREDIENT | % | Mass (kg) |
| --- | --- | --- |
| Skim milk | 72.05 | 7.205 |
| Milk fat substitute | 10.00 | 1.000 |
| Powdered skim milk | 2.00 | 0.200 |
| Sugar | 15.00 | 1.500 |
| Integrated mixture of emulsifier and stabilizers* | 0.65 | 0.065 |
| Strawberry flavor | 0.30 | 0.030 |
| Total | 100.00 | 10.000 |

*fatty acid mono- and diglycerides, carboxymethylcellulose, carrageenan and guar gum.

All the ingredients were admixed and the mixture was pasteurized at 80° C. for 10 minutes; then the mixture was homogenized at 16 MPa; then the mixture was cooled down under 10° C. and was refrigerated during 48 hours. The ice cream base was taken to crystallization. The resulting ice cream had a smooth, homogeneous and fine texture. The resulting overrun was between 100 and 110%.

Example 6

Elaboration of a Cream Substitute for Coffee

Two kg of cream substitute for coffee were prepared using the milk fat substitute of example 1.

| INGREDIENT | % | Mass (g) |
| --- | --- | --- |
| Powdered skim milk | 9.00 | 180 |
| Milk fat substitute | 10.00 | 200 |
| Sodium citrate | 0.05 | 1 |
| Sodium Phosphate | 0.05 | 1 |
| Integrated mixture of emulsifier and stabilizers* | 0.30 | 6 |
| Water | 80.00 | 1600 |

*fatty acid mono- and diglycerides, lecithin, carrageenan and guar gum.

Process: Water and milk and salts were mixed and the mixture was allowed to hydrate during 20 minutes at 40° C. The integrated mixture of emulsifiers and stabilizers and the previously melted fat were then added. The mixture was pasteurized at 80° C. for 5 minutes. Then the mixture was homogenized at 10 MPa. Afterwards, the product was cooled down to a temperature of 20° C. and refrigerated.

A spoon full of cream for coffee was added into a cup of hot coffee. The substitute was easily dispersed and gave to the coffee a good creamy body. The taste and aroma of the hot beverage were very pleasant.

It will be evident to a skilled in the art that various substitutions and modifications can be done to the described invention without departing away from the scope and spirit thereof. The herein described invention can be adequately practiced without any element or elements, limitation or limitations not specifically describe herein. The used terms and expressions were used as terms and expressions of the description and do not pretend to limit in any way the invention, and it must be recognized that many modifications are possible within the scope of the invention. Thus, it must be understood that even if the present invention has been exemplified with specific embodiments and optional characteristics, modifications and variations of the herein described concepts can be made by a skilled in the relevant art. Such modifications and variations are considered within the scope of this invention.

The invention claimed is:

1. A process for producing a milk fat substitute, comprising:
    fractioning a vegetable oil;
    filtering the fractioned vegetable oil to obtain a first olein fraction and a first stearine fraction;
    fractioning the first stearine fraction;
    filtering the fractioned first stearine fraction to obtain a second olein fraction and a second stearine fraction;
    mixing the first olein fraction with the second olein fraction to obtain a mixture;
    at least one of refining, bleaching, deodorizing, and adding color, flavor and emulsifiers to the mixture; and
    crystallizing the mixture to obtain a milk fat substitute.

2. The process of claim 1, wherein the fractioning of the vegetable oil comprises heating the vegetable oil to a temperature between 60° C. and 90° C. and fractioning the vegetable oil for between 8 and 20 hours, and then cooling the fractionated vegetable oil to a final temperature of between 14° C. and 27° C.

3. The process of claim 2, wherein the filtering of the vegetable oil is carried out through a press filter at a feeding pressure of between 50 and 500 manometric kPa and a squeeze pressure of between 100 manometric kPa and 1 manometric MPa.

4. The process of claim 3, wherein the fractioning of the first stearine fraction comprises heating the first stearine fraction to a temperature between 60° C. and 90° C and fractioning the first stearine fraction for between 12 and 32 hours, and then cooling the fractionated first stearine fraction to a final temperature of between 3° C. and 47° C.

5. The process of claim 4, wherein the filtering of the first stearine fraction is carried out at through a press filter at a feeding pressure of between 100 and 800 manometric kPa and at a squeeze pressure between 1 and 3 manometric MPa.

6. The process of claim 5, wherein the mixing of the first olein fraction with the second olein fraction to obtain a mixture comprises mixing between 50% and 90% of the first olein fraction with between 10% and 50% of the second olein fraction,
    wherein a melting point of the milk fat substitute is between 30° C. and 40° C. and a saturated fat content is no more than 55% based on a total fat content of the milk fat substitute,
    wherein a solid fat content of the milk fat substitute is at least one of:
        between 37% to 57% at 10° C.,
        between 10% to 27% at 20° C.,
        between 1% to 10% at 30° C., and
        no more than 2% at 40° C. and
    wherein, based on a total fatty, acid content of the milk fat substitute, the milk fat substitute comprises:
        no more than 1% lauric acid content
        no more than 2% myristic acid content,
        between 34% and 48% palmitic acid content,
        between 1% and 8% stearic acid content,
        between 35% and 49% oleic acid content,
        between 6.5% and 13.5% linolenic acid content, and
        no more than 0.5% linolenic acid content.

7. The process of claim 1, wherein the fractioning of the vegetable oil comprises heating the vegetable oil to a temperature between 75° C. and 85° C. and a fractioning the vegetable oil for between 12 and 16 hours, and then cooling the fractionated vegetable oil to a final temperature between 17° C. and 24° C.

8. The process of claim 7, wherein the filtering of the vegetable oil is carried out through a press filter at a feeding pressure between 100 and 400 manometric kPa and at a squeeze pressure between 200 and 900 manometric kPa.

9. The process of claim 8, wherein the fractioning of the first stearine fraction comprises heating the first stearine fraction to a temperature between 75° C. and 85° C and fractioning the first stearine fraction for between 14 and 24 hours, and then cooling the fractionated first stearine fraction to a final temperature is between 39° C. and 45° C.

10. The process of claim 9, wherein the filtering of the first stearine fraction is carried out at a feeding pressure of between 200 to 700 manometric kPa and a squeeze pressure of between 1.2 and 2.4 manometric MPa.

11. The process of claim 10, wherein the mixing of the first olein fraction with the second olein fraction to obtain the mixture comprises mixing between 60% and 73% of the first olein fraction with between 27% and 40% of the second olein fraction,
    wherein the melting point of the milk fat substitute is between 32° C. and 36° C. and the saturated fat content is no more than 50%, based on the total fat content of the milk fat substitute,
    wherein the solid fat content of the milk fat substitute is at least one of:
        between 42% to 52% at 10° C.,
        between 15% to 22% at 20° C.,
        between 3% to 7% at 30° C. and
        no more than 1% at 40° C., and,
    wherein, based on a total fatty acid content of the milk fat substitute, the milk fat substitute comprises:
        no more than 0.6% lauric acid content,
        no more than 1.2% myristic acid content,
        between 39% and 43% palmitic acid content,
        between 3% and 6% stearic add content,
        between 40% and 44% oleic add content,
        between 8.5% and 11.5% linoleic acid content, and
        no more than 0.35% linolenic acid content.

12. The process of claim 11, wherein the vegetable oil is a palm oil obtained from at least one of Elaeis guineensis, Elaeis oleifera (Elaeis melanocacca), and the fruit of hybrids obtained through crossing Elaeis guineensis with Eiaeis oleifera.

13. A method to produce a milk fat substitute, essentially consisting of:

fractioning and filtering a vegetable oil to obtain a first olein fraction and a first stearine fraction;
fractioning and filtering the first stearine fraction to obtain a second olein fraction and a second stearine fraction;
mixing between 50% and 90% of the first olein fraction with between 10% and 50% of the second olein fraction; and
at performing at least one of refining, bleaching, deodorizing, adding color, flavor and emulsifiers, and crystallizing the mixture to obtain a milk fat substitute.

14. The method to claim 13, wherein the milk fat substitute has a melting point between 30° C. and 40° C. and a saturated fat content of no more than 55%, based on a total fat content of the milk fat substitute, and wherein a solid fat content of the milk fat substitute is at least one of:
   between 37% to 57% at 10° C.,
   between 10% to 27% at 20° C.,
   between 1% to 10% at 30° C., and no more than 2% at 40° C., and
wherein, based on a total fatty acid content of the milk fat substitute, the milk fat substitute comprises:
   no more than 1% lauric acid content,
   no more than 2% myristic acid content,
   between 34% and 48% palmitic acid content,
   between 1% and 8% stearic acid content,
   between 35% and 49% oleic acid content,
   between 6.5% and 13.5% linoleic acid content, and
   no more than 0.5% linolenic acid content.

* * * * *